(12) United States Patent
DeJean et al.

(10) Patent No.: US 7,677,438 B2
(45) Date of Patent: Mar. 16, 2010

(54) RADIO FREQUENCY CERTIFICATES OF AUTHENTICITY

(75) Inventors: Gerald DeJean, Redmond, WA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1295 days.

(21) Appl. No.: 11/170,720

(22) Filed: Jun. 29, 2005

(65) Prior Publication Data

US 2007/0005367 A1 Jan. 4, 2007

(51) Int. Cl.
*G06F 17/00* (2006.01)
(52) U.S. Cl. .................. 235/375; 235/487; 235/380; 235/382; 704/201; 343/846; 375/173; 375/132; 375/261; 705/39; 705/59; 705/75
(58) Field of Classification Search .......... 235/487, 235/380, 382, 375; 704/201; 343/846; 375/173, 375/132, 261; 705/39, 59, 75
See application file for complete search history.

(56) References Cited

U.S. PATENT DOCUMENTS

| | | | |
|---|---|---|---|
| 5,450,090 A | | 9/1995 | Gels et al. |
| 7,106,199 B2 * | | 9/2006 | Lee et al. ............ 340/572.3 |
| 7,345,647 B1 | | 3/2008 | Rodenbeck |
| 2004/0001568 A1 | | 1/2004 | Impson et al. |
| 2004/0066273 A1 * | | 4/2004 | Cortina et al. ........... 340/5.1 |
| 2004/0132406 A1 | | 7/2004 | Scott et al. |
| 2005/0156318 A1 | | 7/2005 | Douglas |
| 2006/0259304 A1 * | | 11/2006 | Barzilay ................ 704/273 |
| 2007/0132640 A1 | | 6/2007 | Kim et al. |

FOREIGN PATENT DOCUMENTS

WO  WO03023900 A1  3/2003

OTHER PUBLICATIONS

PCT Search Report for International Application No. PCT/US 06/22861, mailed Jul. 23, 2007 (7 pages).

* cited by examiner

*Primary Examiner*—Allyson N Trail
(74) *Attorney, Agent, or Firm*—Lee & Hayes, PLLC (57) ABSTRACT

Radio frequency certificates of authenticity (RFCOAs) are presented. In one implementation, a scattering agent is attached to an object to provide a reproducible radio frequency (RF) fingerprint that can be used to authenticate a tag or a seal for the object. In one implementation, the RF fingerprint is measured and digitized, combined with information associated with the object to which the RFCOA is attached, and stored in a radio frequency identification (RFID) system associated with the RFCOA. A scanner receives the fingerprint and the information and authenticates the information by comparing the fingerprint against a new fingerprint obtained from the object.

20 Claims, 5 Drawing Sheets

Array Of Sixteen Antennae

Fig. 5

RADIO FREQUENCY CERTIFICATES OF AUTHENTICITY

BACKGROUND

A certificate of authenticity (COA) is an inexpensive physical object that is more expensive to replicate than the product or circumstance that it certifies as authentic. A COA has a random unique structure that provides both a unique ID and an avenue for authenticating the unique ID. Additional desirable characteristics of a COA are that the uniqueness of the COA's random structure can be verified using an inexpensive device and/or at some distance from the COA.

From an economic standpoint, a COA is a digitally signed physical object that has a random unique structure for which the cost of creating and signing original COAs is small, relative to a desired level of security. The cost of manufacturing a COA instance should be several orders of magnitude lower than the cost of exact or near-exact replication of the unique and random physical structure of the instance. The cost of verifying the authenticity of a signed COA is also small, again relative to a desired level of security.

An additional characteristic, mainly impacted by desired level of usability, is that a COA must be robust to ordinary wear and tear. To this end, COA instances can be created in numerous ways. For example, when covering a substrate with an epoxy layer, the epoxy particles form a low-rise but randomized 3-dimensional (3-D) landscape that uniquely reflects light directed from a certain position. Such COAs were used for weapons control during The Cold War. There are also COAs created as a collection of optical fibers randomly positioned in an object using a transparent gluing material which permanently fixes the fibers' positions. Readout of the random structure of such a fiber-based COA can be performed in a number of ways using the fact that if one end of a fiber is illuminated, the other end will also glow. Fiber-based COAs have been proposed for banknote protection—the fibers being fixed by a semi-transparent material such as paper.

Only a few efforts have followed these initial forays into creating certificates of authenticity. For example, creating a class of physical one-way functions via speckle scattering has been tried by focusing on Gabor wavelets to produce short digests of the natural randomness collected from an optical phenomenon.

A fiber-based COA scanner prototype has been created, as well as a system for automatically verifying fiber-based COAs to emphasize the impact of point-subset compression on COAs' forging costs. Finally, COAs in the electromagnetic domain have been proposed by several companies such as TAPEMARK (St. Paul, Minn.) and CROSSID (Israel), all of them aiming to detect an RFID's random structure in the far-field. Such detection is prone to spoofing; in addition, such RFIDs can be relatively easily replicated. Also, because detection takes place in the far-field, both of these systems operate in the expensive 60 GHz frequency sub-band.

SUMMARY

Radio frequency certificates of authenticity (RFCOAs) are presented. In one implementation, a scattering agent is attached to an object to provide a reproducible radio frequency (RF) fingerprint that can be used to authenticate a tag or a seal for the object. In one implementation, the RF fingerprint is measured and digitized, combined with information associated with the object to which the RFCOA is attached, and stored in a radio frequency identification (RFID) system associated with the RFCOA. A scanner receives the fingerprint and the information and authenticates the information by comparing the fingerprint against a new fingerprint obtained from the object.

In one implementation, the RFCOA can also provide a secure communication channel by storing the read fingerprint response in the associated RFID system. The RFID system thereafter knows what fingerprint response should be expected in order to release (transmit) its content to the outside world. This prevents reading the content of the RFID from afar without having close physical contact with the RFCOA tag. Security can also be enhanced by hashing the combined fingerprint and object information and signing the result with a key. A privacy manager in the RFCOA can then decide which information to divulge, based on security credentials of a particular scanner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Systems and methods are described for making and using objects that behave as certificates of authenticity (COAs) in the radio frequency (RF) band of the electromagnetic radiation spectrum (hereinafter referred to as "RFCOAs").

An RFCOA consists of a scattering agent consisting of one or more materials dispersed in a 3-D substrate or matrix to form a unique physical structure. The unique physical structure of the scattering agent reflects and refracts radio waves, creating a reproducible pattern.

The pattern is used as a signature or digital fingerprint readable by an inexpensive scanner. This fingerprint of the unique physical structure of the RFCOA can be encrypted and stored in a RFID system onboard the RFCOA along with information about a product to which the RFCOA is attached. Thus, an RFCOA can be used as a product tag or seal that can be read remotely via the RFID for product information (and to receive the encrypted signature), and then verified for authenticity at close range by decrypting and comparing the fingerprint from the RFID with a newly rescanned fingerprint from the actual RFCOA itself. If the fingerprint match within tolerances, then the association between the product information and the product itself is authenticated. Also authenticated is the fact that the original placement of the RFCOA on the product as a tag or a seal remains intact.

The system and methods described herein provide a unique feature: knowing the signature response of a RFCOA 102, it is computationally difficult to learn the actual unique physical random structure of the RFCOA 102. In one implementation, exemplary RFCOAs described herein complement RFID technology, so that a package combining both is physically, not just digitally, unique and difficult to replicate. Such a packaged combination creates a "super-tag" whose information about a product can be read within a relative far-field, and also whose authenticity can be verified within its near-field with a low or zero probability of false alarm.

The exemplary RFCOAs described herein have many important uses, especially as tags and seals for products. As a tag, an RFCOA can be added inexpensively to most any product or packaging item—e.g., to a television set, a carton of food, a passport, the hull of a ship, etc. The RFCOA can be integrated into the manufacturing process, so that the RFCOA is inseparable from the product, for example, the RFCOA can be made part of a surface of the object. The RFCOA certifies the authenticity of the item as the "genuine article" and the accompanying information about the item stored as an RFID part of the RFCOA is also authenticated as genuine. Thus, for example, for a person traveling internationally, an RFCOA on a portable television set or on a portable computer can inform repair facilities around the world not only of the item's model and serial number but can also authenticate the item's true purchase date, price, and warranty period, etc.

When used as a seal, an RFCOA can be added to prescription drug packaging or to a container of liquid—e.g., the access hatch for a supertanker of oil—to verify the contents and information about the contents. An RFCOA seal also authenticates itself, since if the RFCOA is functioning then the seal is unbroken, and the information that the RFCOA seal may carry (e.g., about who placed the seal) is true.

The exemplary RFCOAs described herein have several advantages over conventional COAs. First, the entropy of the readout response—the RF pattern reflected and refracted from an RFCOA—is typically significantly larger than from other types of COAs. In other words, the sheer amount of random information used as part of the unique ID can be much higher for an RFCOA than for conventional COAs. Accordingly, the difficulty of foiling a RFCOA by replicating it may be several orders of magnitude higher compared to fiber-based COAs. Finally, qualitatively, it is difficult to figure out an RFCOA's physical structure based upon the RF reflection and refraction pattern obtained from it—an advantage not shared by conventional epoxy and fiber-based COAs. This latter feature is of particular importance in case an adversary obtains the response signal (e.g., access to a reader, breach into a database which stores the responses, such as a credit card reader database, etc.).

Exemplary Authentication System

Figure 1:
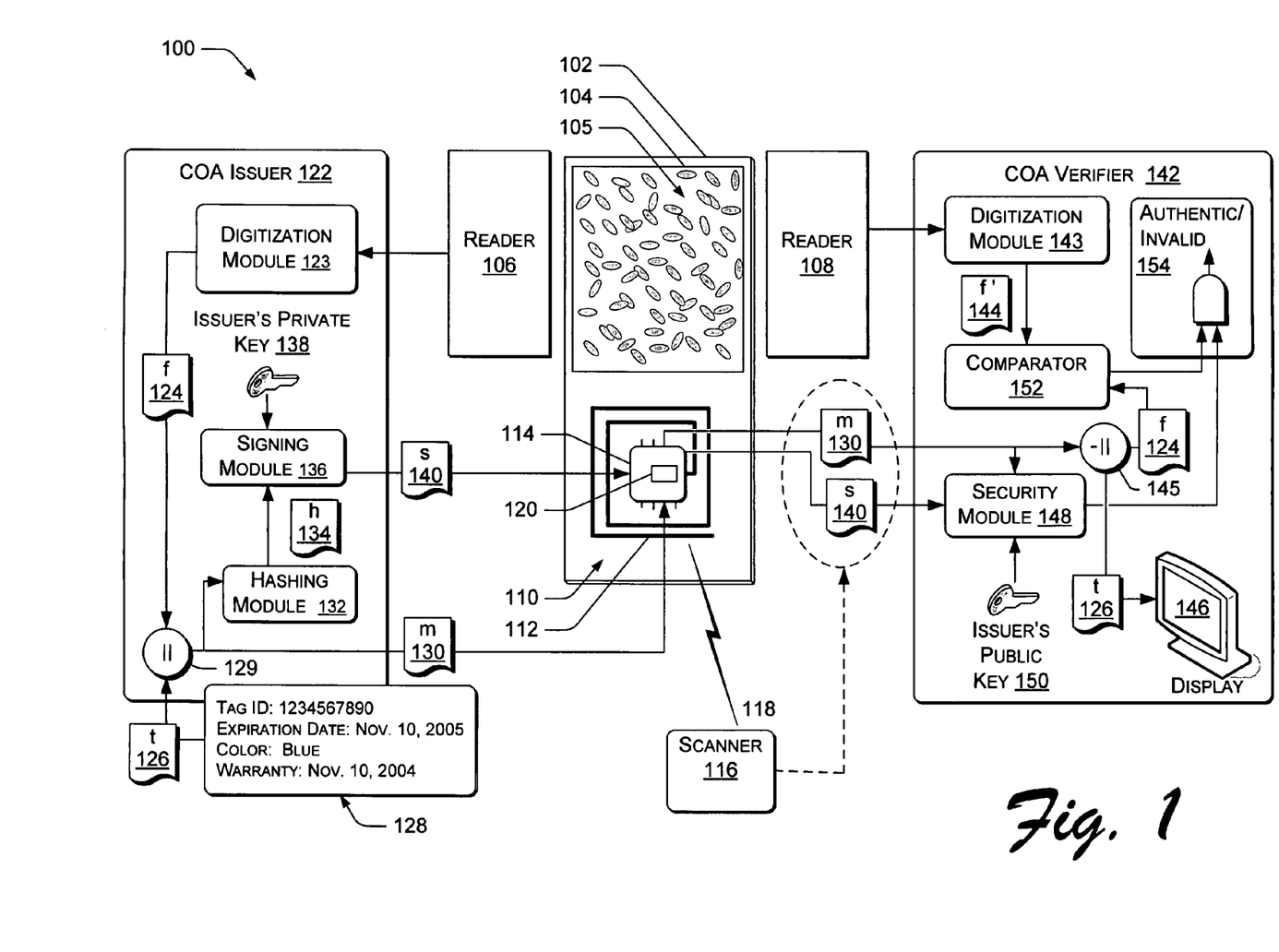
FIG. 1 is a diagram of an exemplary radio frequency authentication system.

FIG. 1 shows an exemplary authentication system 100 that uses an exemplary RFCOA 102. The exemplary authentication system 100 is meant to provide one example of components and arrangement for the sake of overview. Many other arrangements of the illustrated components, or similar components, are possible. Such an exemplary authentication system 100 can be executed in combinations of hardware, computer executable software, firmware, etc. The components of the exemplary authentication system 100 are introduced next.

The exemplary authentication system 100 includes a radio frequency certification of authority (the RFCOA 102) that may be attached as a tag or a seal to a physical object. The RFCOA 102 includes a unique physical structure segment 104 in which a scattering agent 105 is immobilized in a 3-dimensional matrix to uniquely reflect and refract incoming radio frequency energy to be detected by one or more external readers 106, 108.

In one implementation, the RFCOA 102 includes a radio frequency identification (RFID) system 110 that includes a transponder 112 and an integrated circuit chip 114 for communicating information to a remote scanner 116 via a scanning antenna 118 of the remote scanner 116. The RFID system 110 may include a privacy manager 120 to control the information transmitted by the RFID system 110 based on receiving a fingerprint response from a reading of the scattering agent 105 that matches a previously loaded fingerprint response stored in the RFID system 110. The privacy manager 120 may also control information based on the credentials presented by a particular remote (RFID) scanner 116.

A certificate of authenticity (COA) issuer 122 is included in the exemplary authentication system 100. The COA issuer 122 includes the reader 106, for detecting a unique pattern of reflected and refracted radio frequency energy from the scattering agent 105. A digitization module 123 digitizes and compresses (or vice versa) analog signals from the reader 106 into a unique structure message referred to herein as a fingerprint (f) 124. The fingerprint (f) 124 represents a difficult-to-replicate statistic of the unique physical structure segment 104 of the RFCOA 102.

A text message 126 may include information 128 about the physical object to which the RFCOA 102 is attached. A concatenator 129 combines the text message 126 with the fingerprint (f) 124 into a combined message 130.

In one implementation, a hashed and signed version of the combined message 130 is created for later verification of the RFCOA 102. A hashing module 132 hashes the combined message 130 into a hashed message 134. A signing module 136 signs the hashed message 134 using a key 138 into a signature message 140. The unhashed and unsigned combined message 130 is issued to (stored in) the RFID system 110 either separately, or in one implementation, and may be concatenated to the hashed and signed signature message version 140 of the same combined message 130.

The COA verifier 142 includes the aforementioned reader 108, to read and detect the unique physical structure segment 104 of the RFCOA 102 in much the same manner as the COA issuer 122 does. Another digitization module 143 digitizes and compresses (or vice versa) analog signals from the reader 108 into a test fingerprint (f') 144 for comparison with the fingerprint (f) 124 issued by the COA issuer 122. In one implementation, a decatenator 145 separates the received combined message 130 into the text message 126 and the fingerprint (f) 124. The text message (t) 126 can be shown on a display 146. In one implementation, a security module 148 uses a key 150 (such as a public key of the issuer's encryption key pair that includes the issuer's private key 138) to verify the signature message (s) 140 against the hash of the combined message (m) 130. If the verification is successful, the associated textual information 128 is shown on the display 146.

The fingerprint (f) 124 from the combined message (m) 130 is passed to a comparator 152 for comparison with the test fingerprint (f') 144 scanned by the COA verifier 142. If the fingerprint (f) 124 and the test fingerprint (f') 144 have a similarity that surpasses a selected threshold, then a readout 154 indicates that the information 128 in the text message 126 is authentic. This also means that the RFCOA 102 is authentically the same RFCOA 102 that the issuer attached to physical object. Alternatively, this also means that if the RFCOA 102 is serving as a product seal, the seal is unbroken.

The further description of an exemplary authentication system 100 is divided into several parts: 1) structure and physical properties of RFCOAs; 2) analog interactions between RFCOAs and RF energy; 3) combinations of RFCOAs and RFIDs; 4) protective value of RFCOAs; 5) RFCOA applications (uses of RFCOAs); 6) digital information exchange via RFCOAs; and 7) RFCOA scanners (readers).

Structure and Physical Properties of RFCOAs

In one implementation, the RFCOA 102 includes a unique physical structure segment 104 that gives rise to a unique signature in a RF portion of the electromagnetic radiation (ER) spectrum. The unique physical structure can be achieved in several ways. In one implementation, numerous pieces of a RF-interactive material hereinafter referred to as a "scattering agent" 105 are dispersed in a fixative. The fixative should be RF wave permeable. The scattering agent 105 is a material that interacts with RF waves, by reflecting, refracting, and/or absorbing incoming or secondarily reflected/refracted RF waves. The scattering agent 105 is typically a metallic conductor, such as metal pieces, plates, "thins," filings, particles, etc., composed of a metal such as copper or aluminum. The scattering agent 105 can also be one or more dielectrics or a combination of one or more metallic conductors and one or more dielectrics, etc. The fixative itself is also typically a dielectric that interacts with RF energy.

In one implementation, the scattering agent 105 consists of small, thin pieces of a metallic conductor and/or dielectric that are placed during manufacture in a dielectric material that fixes their positions permanently. The metallic or dielectric pieces are dispersed into a 3-dimensional arrangement that causes the unique RF signature of the unique physical structure segment 104, when impinged upon by RF waves.

The arrangement of the fixed pieces of the scattering agent 105 typically yields a degree of short term order (or disorder, depending on point of view) and a degree of long term order (or disorder). The randomness inherent in these degrees of order as the scattering agent 105 interacts with incoming RF energy determines the uniqueness of the signature of the individual RFCOA 102. The amount of randomness imparted results in a degree of entropy. In this case, entropy means the likelihood that an identical dispersion of fixed pieces of scattering agent 105 (including individual orientations of each piece in space and their orientations relative to each other), or, the collective RF signature of all the pieces in an instance of the scattering agent 105 could ever be replicated by someone trying to foil the exemplary authentication system 100. The entropy of a RFCOA 102 increases as more degrees of freedom are provided for components such as the metallic pieces (or dielectric particles) in an instance of scattering agent 105; their number; their shape; the scanning resolution (i.e., number of antennae); and direction of incoming RF waves, etc.

Figure 2:
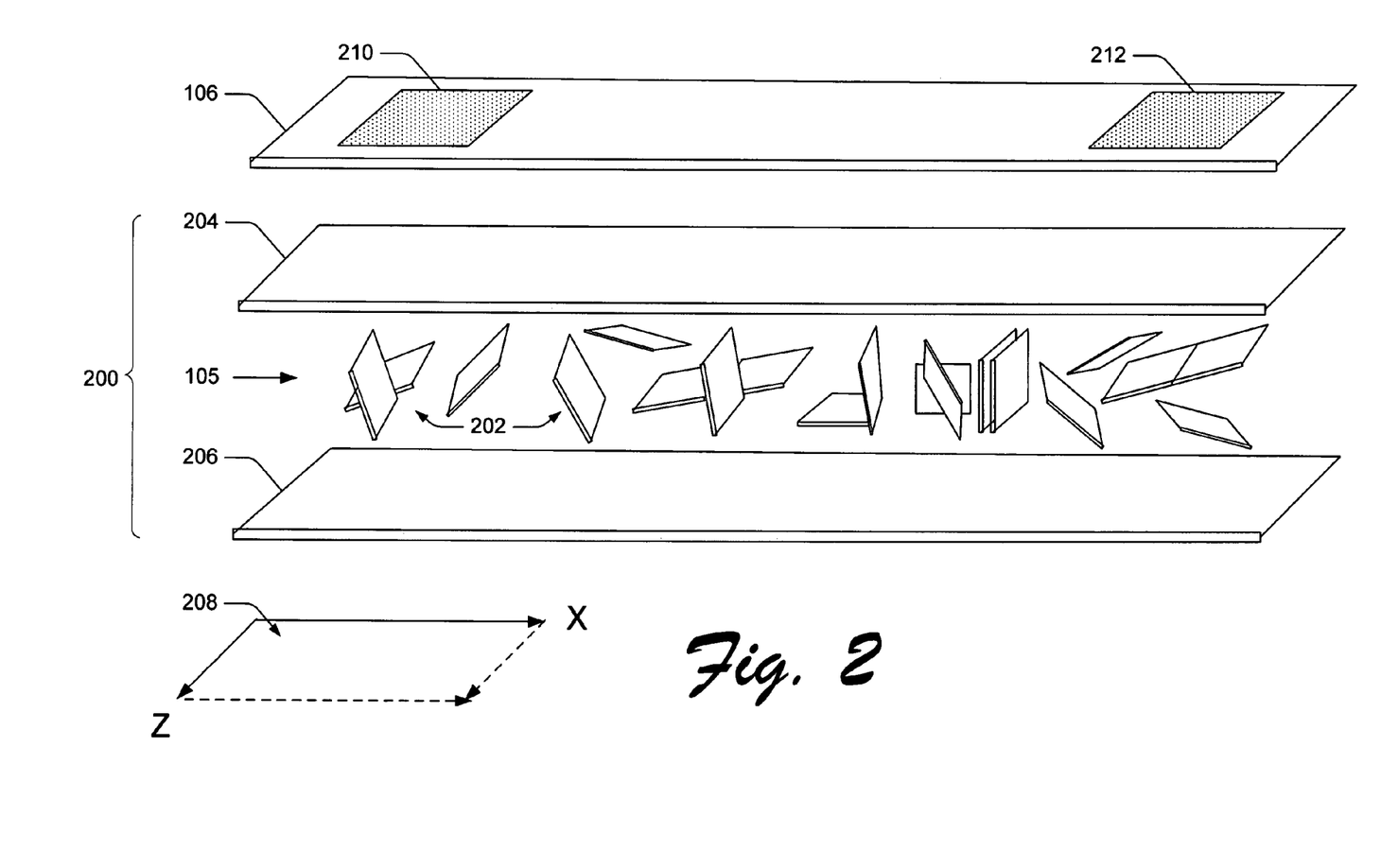
FIG. 2 is a diagram of an exemplary radio frequency certificate of authenticity.

RFCOAs 102 can be built in numerous ways. FIG. 2 shows an exploded view of a planar "card"-shaped version of a RFCOA 200. The card-shaped version is particularly attractive for various applications. In one implementation, the RFCOA 200 is sized and shaped like a credit card so that it can be inserted for authentication in a reader 106 that sandwiches the RFCOA 102 from the top and bottom (only a top reader is shown).

In this implementation, the scattering agent 105 consists of thin conductive plates 202 of arbitrary planar shape, made of a metal, such as copper. The plates 202 are somewhat randomly positioned during manufacture within a dielectric material (not visible in the illustration) to fix their locations and orientations. The plates 202 and impinging RF waves interact in a manner similar to mirror pieces reflecting visible light.

Although in general thin conductive plates 202 may have arbitrary shapes and in some implementations can assume random positioning to compose the scattering agent 105, in the illustrated implementation the thin conductive plates 202 are positioned either parallel or perpendicular with respect to the main outer surfaces 204 and 206 of the RFCOA 200 that lie in the "xz" plane 208 of the RFCOA 200. While a position and orientation of each individual piece is not specified (i.e., is random) the concentration of pieces added to a given fixative medium during manufacture may result in some degree of short range order, especially if the pieces are mixed homogenously with the fixative.

In one implementation, an exemplary RFCOA 200 with geometry similar to a credit card is built using at least two distinct dielectric materials with distinct dielectric constants. The mix of dielectrics is locally homogeneous but globally heterogeneous, similar to the short range and long range order of atoms in amorphous solid materials. That is, the scattering agent 105 of an exemplary RFCOA 200 may possess little or no long range translational order, and has a degree of randomness in the positions of the individual dielectrics. However, the RFCOA 200 may possess a local order over length scales of a few individual dielectric pieces even through there is disorder on larger length scales. Such an exemplary RFCOA 200 can be built by mixing large particles of arbitrary shape of one dielectric into a fixative that is another dielectric. The dielectrics should not dissolve on contact with each other and the dielectric that acts as fixative should harden in order to permanently fix the locations of the particles.

Analog Interactions Between RFCOAs and RF Energy

Figure 3:
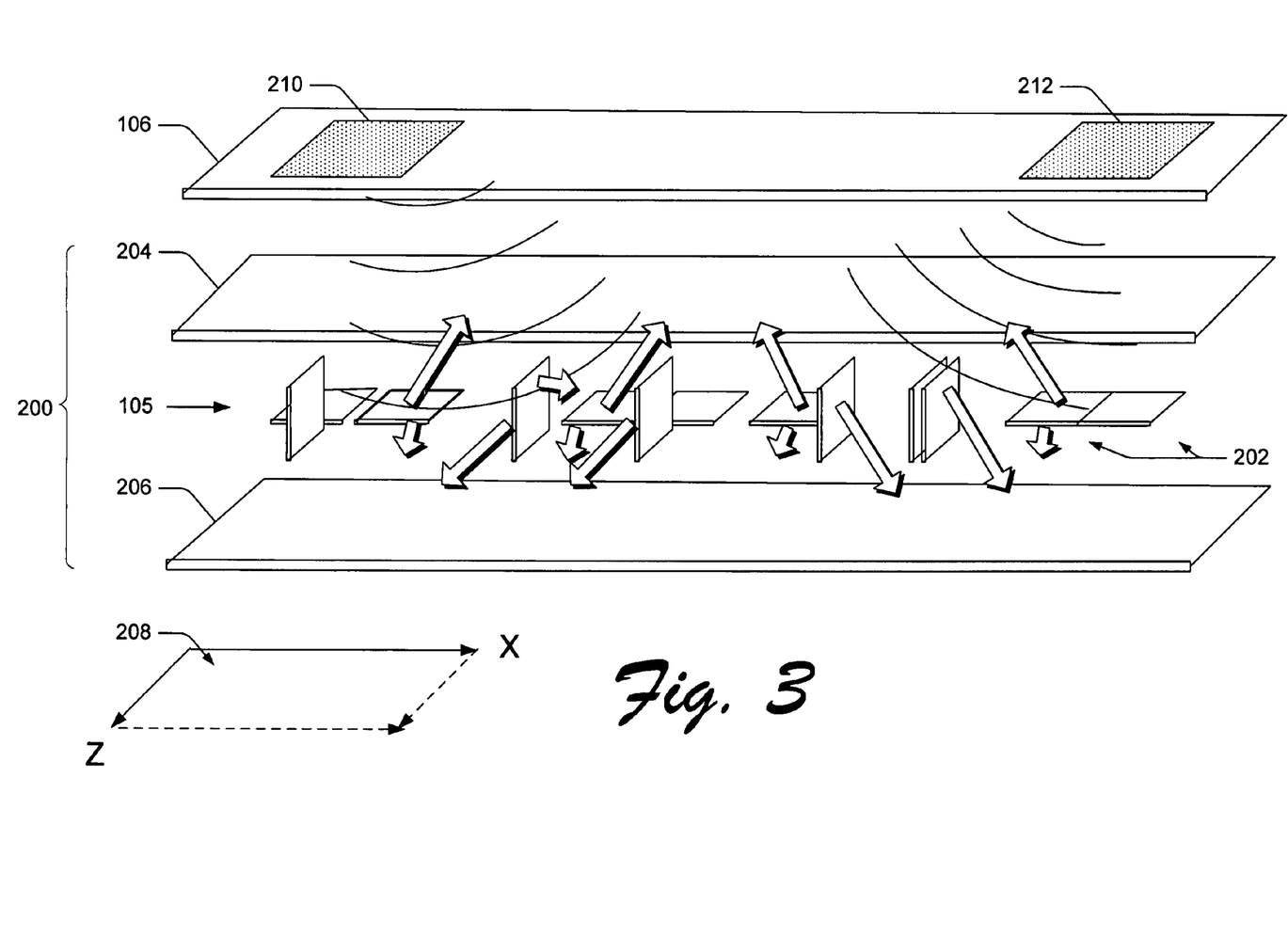
FIG. 3 is a diagram of exemplary radio frequency energy scattering by an exemplary radio frequency certificate of authenticity.

As shown in FIG. 3, a reader (such as 106 or 108) for authenticating the exemplary RFCOA 200 radiates, transmits, broadcasts, etc., RF energy to the fixed pieces of metallic and/or dielectric material of the scattering agent 105. The reader 106 then acts as an RF receiver to read the RF scattering response of the particular RFCOA 200.

A typical reader 106 has a matrix (hereinafter, "array") of antennae to perform transmission and reception of RF waves. In FIG. 3, only two antennae 210 and 212 are shown to simplify the description, but each of these can perform both transmission and reception of RF waves.

The reflecting surfaces of the fixed pieces 202 of the scattering agent 105 and/or the refracting surface boundary interfaces between the fixed pieces 202 and the fixative reflect and refract RF energy (shown by white arrows) generated by the reader 106. The reflection and the refraction create a reproducible fingerprint, i.e., a "scattering pattern" to be picked up by the antennae 210, 212. By analogy, this scattering pattern response can be understood in terms of a scenario in which small mirror pieces and/or glass pieces are fixed in a clear medium, so that when visible light is shone on the conglomerate the reflected light forms unique pattern of reflected/refracted light, such as a person's name. With respect to a RFCOA 200, however, the RF-interactive pieces are not positioned to create a predetermined name or number, but rather are dispersed randomly and then fixed into position, yielding a random scattering pattern from which a random but reproducible number or pattern can be filtered and/or computed after the pieces have been fixed in their random positions.

The main physical phenomena that provide the random scattering pattern of RF energy to make the unique signature are described by Snell's Law of refraction and reflection. In one implementation, as the incoming RF electromagnetic radiation strikes the boundary of two materials with different indices of refraction ($n_1$ and $n_2$) at an incident angle $\theta_1$, the RF radiation is both reflected and refracted. Snell's Law holds that reflected RF waves leave surfaces at an angle corresponding to the angle of incidence of the incoming RF waves, i.e., $\theta'_1 = \theta_1$. Refraction occurs at an interface between abutting materials at an angle $\theta_2$ such that: $n_1 \sin \theta_1 = n_2 \sin \theta_2$, where $n_1$ and $n_2$ are the indices of refraction of the respective materials. The index of refraction of a material is typically proportional to the dielectric constant $\in$ of the material and the magnetic permeability $\mu$ of the material, as shown in Equation (1):

$$n = \sqrt{\in \mu} \qquad (1)$$

Some conductive materials, such as copper and aluminum, almost completely reflect many frequencies of RF radiation. Certain ceramics and other composites, on the other hand, can absorb a large percentage of the energy of an impinging RF wave. Each of these phenomena, reflection, refraction, and absorption, can take part in the unique RF signature obtained.

Combination RFCOA and RFID

Returning to FIG. 1, The RFCOA 102 may also include an RFID system 110, typically with a transponder 112. The RFID system 110 may be active or passive and may include an integrated circuit chip 114, or may be of the chipless type. In one implementation, a conventional RFID tag may be used as the RFID system 110 as the (e.g., copper) particles or thins of the unique physical structure segment 104 do not affect the communication capabilities of the conventional RFID tag.

An RFID scanner 116 has a scanning antenna 118 that puts out RF signals at a relatively far range compared with the (near-field) reader 106. If the RFID system 110 of the RFCOA 102 is passive, then the RF energy performs two functions, providing communication with the RFID system 110 via RFID segment's transponder 112 and providing the RFID system 110 with the energy to communicate, i.e., acting as the power supply. Thus, a passive RFID system 110 does not need to include a battery and can remain usable indefinitely, yielding a RFCOA 102 that needs no onboard power supply and can function indefinitely as both an RFID and a COA.

In one implementation, a reading of the fingerprint response from the scattering agent 105 of the RFCOA 102 is stored in the RFID system 110. The RFID system 110 or a privacy manager 120 then decides whether or not to release or transmit its RFID (product) information to an outside RFID scanner 116 based on whether the scanner 116 can also provide a newly scanned fingerprint response from the scattering agent 105 of the RFCOA 102. This prevents an outside entity from reading the content of the RFID from afar without having a close contact with the physical RFCOA 102 itself.

In one implementation, the privacy manager 120 decides which information, if any, is to be given out to a particular RFID scanner 116, depending on the rights, credentials, licenses, keys, etc., possessed by the RFID scanner 116. Hence, if the RFID scanner 116 presents no credentials within the RF energy being radiated to the exemplary RFCOA 102, then the RFID system 110 may decide to be non-responsive or to provide only minimal information. If the RFID scanner 116 possesses a certain public key, then the RFID system 110 may reveal more information. If the RFID scanner 116 possesses a secret key that also includes information that could only have been gleaned from the RFCOAs unique physical structure segment 104, then the RFID system 110 may reveal secret information or may open itself to complete disclosure of secure information.

Protective Value of Exemplary RFCOAs

RFCOA instances are "objects of value." The value that an instance of a RFCOA 102 represents approximately equals the cost to forge the RFCOA 102 or copy and modify associated information, given a desire to pirate the RFCOA's associated product, object, or item. In one implementation, in order to counterfeit objects protected by a RFCOA 102, a would-be pirate has to either compute the private key 138 of the issuer—a task which can be made arbitrarily difficult by adjusting the length of the key(s) of a crypto-system, or the pirate has to devise a manufacturing process that can exactly replicate an already signed RFCOA instance: a task which is not necessarily infeasible but requires a certain expense by the pirating party.

The cost of forging dictates the value that a single RFCOA 102 can protect. The would-be pirate could also misappropriate signed RFCOA instances from the issuer and attach them to products, but this can be prevented by the entity that issues the RFCOAs 102. Thus, a RFCOA 102 can be used to protect objects or situations whose value roughly does not exceed the cost of forging a single RFCOA 102, including the accumulated development of a successful adversarial manufacturing process.

RFCOA Applications

Because the cost to make an exemplary RFCOA 102 and the cost to perform an authentication is inexpensive, RFCOAs 102 are particularly attractive for several conventional applications as well as for a myriad of new ones.

An RFCOA 102 can be associated with each instance of conventional monetary paper bills. Checks, money orders, and credit cards can be signed manually and also with a RFCOA 102 of an account holder. Banks, account holders, and check recipients can verify that a certain check has been issued by a certain bank. This framework can enable all the features that would enable a monetary system to transfer, share, merge, expire, or vouch checks.

RFCOAs 102 can also be used in license tags, warranties, and receipts. Current conventional certificates of authenticity based on sophisticated printing technologies suffer from relative ease of replication and/or license alteration. While the exemplary authentication system 100 aims at remedying this deficiency, it also enables several other features such as proof of purchase/return, proof of repair, a transferable warranty, etc.

In many circumstances, the RFCOA 102 should be firmly attached to the associated object as an adversary may try to remove, substitute, or attach different valid RFCOAs 102 at will. Some of these problems can be rectified by devaluing RFCOAs 102 at point of sales or by recording transactions on the RFCOA 102 itself. For example, a license tag may consist of two independently identifiable RFCOA instances, where one is deleted at purchase time to signal a sold product. The same procedure can be used to signal and/or value a product's "nth owner."

Besides providing a relatively secure way of issuing and verifying coupons and tickets, the exemplary authentication system 100 enables multiple parties to reliably participate in complex business models such as third-party conditional discounts and coupon/ticket sharing and transfer.

RFCOAs 102 can make personal ID cards (both paper and smart card based) difficult to copy. In addition, RFCOAs 102 can protect and/or reliably associate additional information with signed paper documents or artwork in a manner that can be authenticated at future times.

RFCOAs can also be used to create casings for processors or smart-cards that can provide strong evidence of whether the chip has been tampered with.

Digital Information Exchange via Exemplary RFCOAs

In one implementation, an RFCOA issuer 122 produces an instance of RFCOA information that includes information from the RFCOA's unique physical structure segment 104 to be issued to and stored as information in a RFID system 110 of the RFCOA 102.

First, a statistic or other characteristic of a RFCOA's unique physical structure segment 104 is digitized and compressed into a fingerprint (f) 124. Next, the fingerprint (f) 124 is concatenated to a textual information message (t) 126 that typically includes the type of information 128 that would be stored in a typical RFID system 110 (e.g., product ID, expiration date, etc.). The resulting combined message (m) 130 is a concatenation of fingerprint (f) 124 and text message (t) 126, that is, m=f∥t.

In one implementation, a hashing module 132 hashes combined message (m) 130 using a cryptographically secure hash algorithm H( ) such as SHA1. This hash is denoted as hashed message (h) 134, i.e., h=H(m). Cryptographic routines based on elliptic curves such as EC-DSA can be used as they yield comparable levels of security to RSA but use significantly shorter signatures. A signing module 136 signs hashed message (h) 134 using a private key 138, e.g., of a public key/private key pair, owned by an issuing entity. The private key 138 can be part of a readily available public key cryptography standard S( ), such as the IEEE 1363.

Finally, in one implementation, the resulting signature message (s) 140 (where s=S(m)) is concatenated to the combined message (m) 130 and stored in the associated RFID system 110 (for example, in a chip 114). This signature message (s) 140 is used to validate that the produced instance of the RFCOA 102 (and the information it relays about the object it is attached to) is authentic.

Each instance of a RFCOA 102 is associated or bound with an object that has an authenticity that the user wants to vouch for. For example, a RFCOA 102 may be embedded into the plastic of a credit card or metal pieces may be added to the material being used to construct a product, a package, a tag, or a seal. The process of binding a RFCOA 102 to an object is typically inexpensive because the materials that constitute a RFCOA 102 are inexpensive. The unique signature derived from the happenstance arrangement of individual pieces is inexpensively determined after their fixation.

In one implementation, a scanner 116 of the COA verifier 142 initially scans (via RFID scanner 116) the concatenated combined message (m) 130 and signature message (s) 140 stored in the RFID system 110 as provided by the RFID transponder 112. From the combined message (m) 130, the COA verifier 142 can compute the fingerprint (f) 124 and the text message (t) 126. Next, the security module 148 verifies the signature message (s) 140 against the hash of the combined message (m) 130 using the issuer's public key 150. If the verification is successful, the associated textual information 128 is shown on the display 146.

Then, the COA verifier 142 reads the unique physical structure segment 104 of the RFCOA 102 using reader 108 to gather the statistical properties of the physical structure of the associated RFCOA 102 and creates a test fingerprint (f') 144. The security module 148 and decatenator 145 extract the received fingerprint (f) 124 and then the comparator 152 compares the test fingerprint (f') 144 to the extracted fingerprint (f) 124. If the level of the similarity between the test fingerprint (f') 144 and received fingerprint (f) 124 surpasses a certain threshold, a readout 154 announces an authentic RFCOA 102.

RFCOA Readers and Antennae

RFCOA readers (e.g., 106) can vary widely in the number of individual antennae they include and in the configuration of their one or more antenna arrays. Moreover, multiple readers 106 may be used at once to read a single type of RFCOA 200, for example, a reader on each of three sides of a cubic RFCOA 102.

Different types of readers 106 that have different configurations of antennae and antenna arrays may be used with the same RFCOA 102. That is, a given reader 106 may be used to read an RFCOA 102 and then recheck the RFCOA 102 later for authenticity. Each different reader 106 creates a different scattering pattern from the RFCOA 102 and therefore "sees" a different signature, but whatever signature is produced by a given type of reader 106 is reproducible between the type of reader 106 used and the RFCOA 102. In other words, there is no specification for favoring a particular type of reader 106 construction other than that the reader 106 reads RF signatures from RFCOAs 102 in a substantially reproducible manner.

In one implementation, to elicit a RF scattering response from a RFCOA 102, a reader 106 itself may include one or more RF sources. However, this is not necessary in other implementations in which the RF source may be separate from the RF receiver(s). In one implementation, the RF source and the RF receivers are the same antennae, which may even transmit and receive RF simultaneously.

When RF waves impinge on a RFCOA 102, their near-field reflection and refraction are dependant upon the positioning of the pieces of the scattering agent 105 (e.g., the reflecting/refracting metal thins), which create the unique RF scattering response. Each individual antenna in one or more arrays of antennae can serve as both an RF source and a reader 106 for picking up the RF scattering response of an exemplary RFCOA 102. That is, in one implementation, each antenna both transmits an RF wave and receives an RF scattering signal to establish an RF "image" of the unique physical structure of the RFCOA 102.

To describe how to build various configurations of readers 106 and their respective antennae and arrays, a two antenna array is presented in order to show some principles of operation. In actual practice, a reader 106 for determining a signature for use as a certificate of authenticity has an array of multiple antennae, not just two.

In a two antenna reader 106, each antenna is placed in close proximity to the other. When an instance of the scattering agent 105 is placed in between the two antennae, many different types of frequency-dependent data sets may be collected and measured, e.g., by a conventional network analyzer. The data sets may include scattering parameters ("s-parameters"), phase information, and impedance data, for example. In one implementation, the scattering parameters—s-parameters—are adopted.

Equation (2) shows the total voltage of a device or port, which is the sum of the voltage input into the device or port and the voltage received from the device or port.

$$V_n = V_n^+ + V_n^-. \quad (2)$$

For the two antennae, four specific s-parameters can be obtained, i.e., as a two-port network. A matrix representation of a relationship between voltage and the s-parameters is shown in Equation (3):

$$\begin{bmatrix} V_1- \\ V_2- \end{bmatrix} = \begin{bmatrix} s_{11} & s_{12} \\ s_{21} & s_{22} \end{bmatrix} \begin{bmatrix} V_1+ \\ V_2+ \end{bmatrix} \quad (3)$$

For example, when s-parameters of the two antennae are obtained, the possible parameters collected are $s_{11}$, $s_{12}$, $s_{21}$, and $s_{22}$. S-parameters represent a ratio of the voltage signal caused by RF energy received by an antenna to the voltage signal of RF energy transmitted by the antenna to the RFCOA 102. Between multiple antennae, unique RF responses from distinct three-dimensional structures can be measured as the s-parameters.

In a two antenna system, for example, $s_{12}$ measures the voltage signal caused by RF energy received by antenna 1 to the voltage signal of the RF energy transmitted out by antenna 2. More formally, the s-parameters can be represented as in Equations (4):

$$s_{11} = \frac{V_1^-}{V_1^+}\bigg|_{V_2^+=0} \quad (4)$$

$$s_{12} = \frac{V_1^-}{V_2^+}\bigg|_{V_1^+=0}$$

$$s_{21} = \frac{V_2^-}{V_1^+}\bigg|_{V_2^+=0}$$

$$s_{22} = \frac{V_2^-}{V_2^+}\bigg|_{V_2^+=0}$$

This is one approach that works with near-field transmission and reception of RF energy. In the far-field, the transmission and reception of the antenna's RF energy can be obstructed by buildings, atmospheric conditions, and multi-path signals from other data transmission devices such as cellular phones.

In one implementation, a RFCOA reader 106 has an array of multiple antennae, each of them capable of operating both as a transmitter and a receiver, e.g., for use in "sandwich" configuration of a reader 106 in which a planar RFCOA 102 is inserted between two planar readers 106, or a "stamp-type" configuration of reader 106, in which the reader 106 is positioned on only one side of the RFCOA 102. In this case, the RFCOA 102 has an absorbent and/or reflective background so that the environment behind the RFCOA 102 does not affect its RF response.

Figure 4:
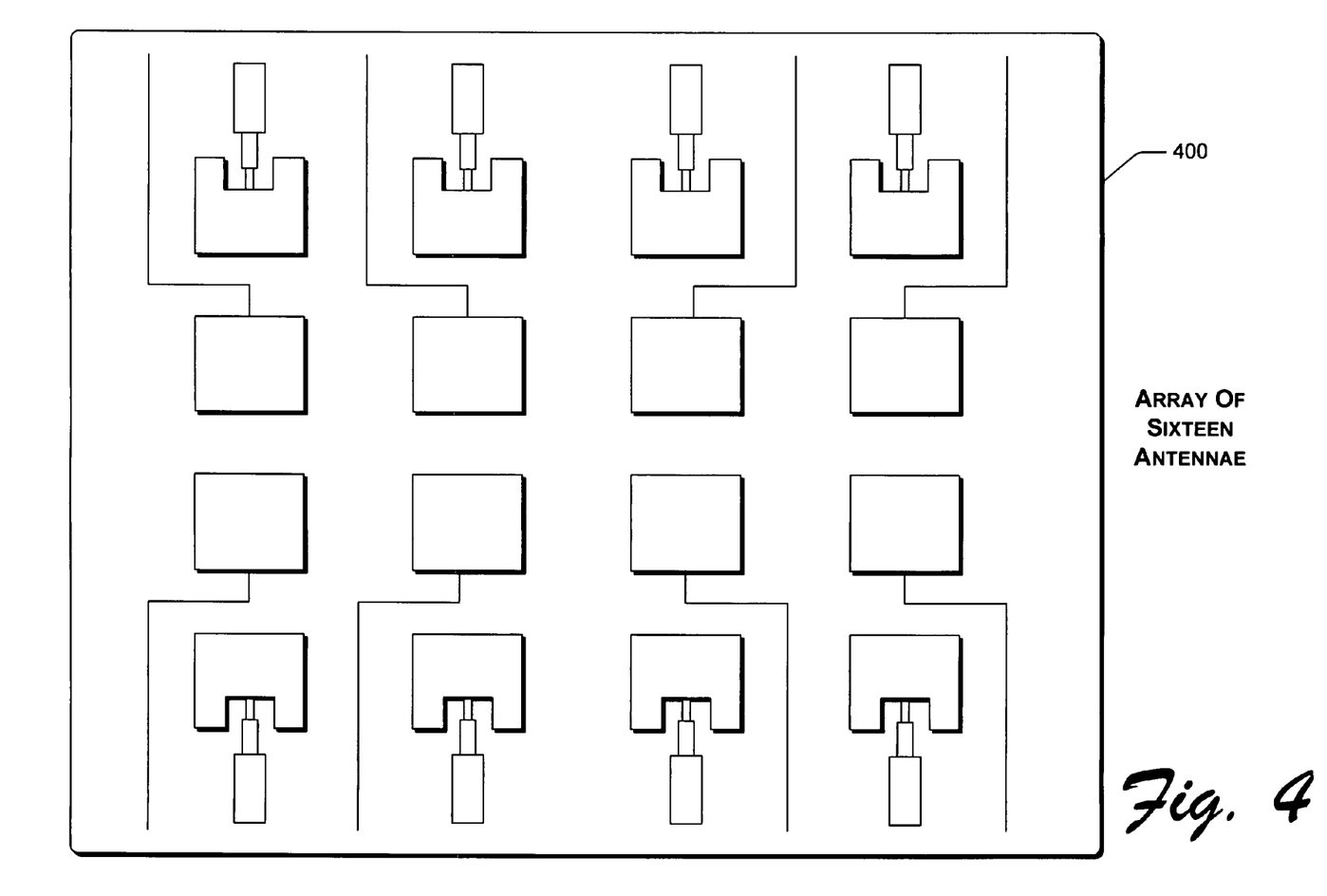
FIG. 4 is a diagram of an exemplary antenna array for scanning an exemplary radio frequency certificate of authenticity.

FIG. 4 shows an exemplary antenna array 400 that can be used in a sandwich type configuration for an RFCOA reader 106. In placing an instance of the RFCOA 102 between two such antenna arrays 400, the COA issuer 122 or the COA verifier 142 can collect numerous measurements including s-parameters for each antenna in the array 400. For a system with M antennae, one can measure a quantity M of $s_{11}$ parameters and a quantity M(M−1)/2 of $s_{12}$ parameters. The entropy of the RF response (i.e., the difficulty of faking the RF response of a RFCOA 102) can be increased depending upon the accuracy of the analog and digital circuitry in the implementation as well as the noise due to external factors.

In one implementation, two exemplary antenna arrays 400 are used. As one antenna is excited on one array panel, on the second array panel all 16 antennae receive signals. Thus, there are a total of 17 antennae that are functioning simultaneously and a total of 289 s-parameter responses. In this implementation, some or all of these 289 s-parameter responses can be used to construct the digital fingerprint of the unique physical structure segment 104. A digital fingerprint is difficult to pirate, because a simulation of the electromagnetic field in the presence of the antenna structures just described—even with the scattering agent 105 consisting of only a single copper thin—is an 8-hour process on a 3 GHz computing device.

The dimensions of an exemplary array 400 are sized so that the operating frequency of each antenna is approximately 6 GHz. Such dimensions allow the RFCOA 102 to be sized in the range of credit cards. Miniaturization is possible because relatively high-powered transmission is not required in the exemplary authentication system 100.

Exemplary Methods

Figure 5:
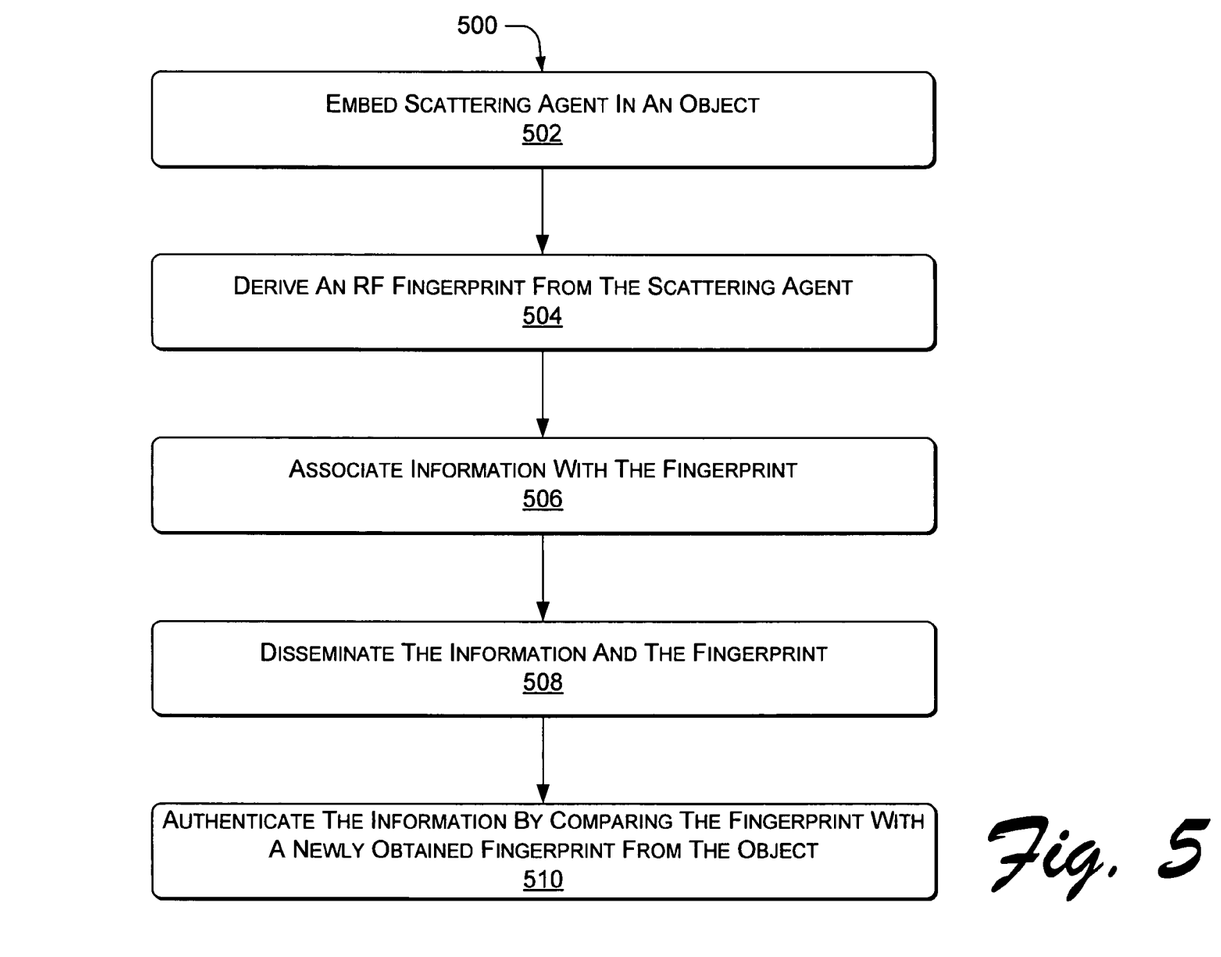
FIG. 5 is a flow diagram of an exemplary method of making and using an exemplary radio frequency certificate of authenticity.

FIG. 5 depicts an exemplary method 500 of making and using an exemplary radio frequency certificate of authenticity (RFCOA). In the flow diagram, the operations are summarized in individual blocks. Parts of the exemplary method 500 may be performed by combinations of hardware, computer executable software, firmware, etc., for example, by components of the exemplary radio frequency authentication system 100.

At block 502, scattering agent is embedded in an object. The scattering agent, which may be numerous pieces of a material, may be embedded into fixed 3-D position in the material(s) making up the object itself. Alternatively, the scattering agent may be immobilized in a fixative, which is then attached to the object. Once embedded in the object, the scattering agent (and its unique RF fingerprint) become one with the object.

At block 504, an RF fingerprint is derived from the scattering agent. The object is exposed to RF energy and the unique scattering pattern caused by the scattering agent reflecting and refracting the RF energy is detected, measured, etc., by a reader. In one implementation, this analog scattering pattern data is digitized and compressed. This results in a unique digital fingerprint of the scattering agent identified with the object.

At block 506, the fingerprint is associated with information. Data about the object or metadata about the object is associated with the fingerprint. The association of the information and the fingerprint can use many forms of combining and securing data, such as simple concatenation, intermixing, encoding, encrypting, hashing, signing, etc., and combinations thereof. In secured implementations, digital rights management techniques can be applied so that disclosure of the information depends on the credentials of the requesting scanner, as information at each level of security can be authenticated via the fingerprint.

At block 508, the information and the associated fingerprint are disseminated. Dissemination of the combined information and fingerprint typically occurs via a RFID transponder associated with the object sending the information and fingerprint to remote scanners pinging for RFID information. A request from a RFID scanner may include security credential information, and the transponder response may be suited to the credentials presented. Once in the possession of a remote scanner, the combined information and fingerprint are no longer in the control of a privacy manager that may be onboard the RFCOA 102 and thus can be disseminated anywhere. The security is still controlled, however, if the information is in encrypted form.

At block 510, the information is authenticated by comparing the fingerprint with a newly obtained fingerprint from the object. Once a scanner is in possession of the combined fingerprint and information, the scanner can separate the fingerprint from the information and authenticate the information by scanning a new fingerprint from the object for comparison with the received fingerprint that was combined with the information. From a different point of view, if the information itself is considered genuine, then the object itself is being authenticated, or its embedded RFCOA 102.

CONCLUSION

The foregoing discussion describes radio frequency certificates of authenticity. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
embedding a scattering agent in a fixative, wherein the embedded scattering agent is fixed in a unique 3-dimensional physical arrangement that reflects, refracts, scatters, reradiates, and induces radio frequency energy;
attaching the scattering agent to a physical object;
reading the embedded scattering agent, wherein the reading includes:
exposing the scattering agent to radio frequency energy,
receiving reflected and refracted radio frequency energy from the scattering agent, and
deriving a digital fingerprint of the unique physical arrangement from the reflected and refracted radio frequency energy;
combining the digital fingerprint with information associated with the physical object; and
using the digital fingerprint to authenticate the information associated with the physical object.

2. The method as recited in claim 1, wherein the embedding further comprises dispersing pieces of at least one metallic conductor in the fixative to reflect radio frequency energy.

3. The method as recited in claim 1, wherein the embedding further comprises dispersing pieces of at least one dielectric in the fixative to refract radio frequency energy.

4. The method as recited in claim 3, wherein the embedding further comprises dispersing the pieces of at least one dielectric in the fixative, wherein the fixative is also a dielectric.

5. The method as recited in claim 1, wherein the embedding further comprises embedding a combination of pieces of at least one metallic conductor and pieces of at least one dielectric in the fixative to reflect and refract radio frequency energy.

6. The method as recited in claim 1, further comprising sealing a product with the scattering agent and fixative as a seal, wherein the receiving reflected and refracted radio frequency energy from the scattering agent to derive fingerprint is possible only as long as the seal is unbroken.

7. The method as recited in claim 1, further comprising combining the embedded scattering agent with a radio frequency identification transponder to create a radio frequency identification (RFID) system that also includes a certificate of authenticity, wherein the digital fingerprint is stored in the RFID system and the RFID system releases the information associated with the physical object only when a request to the RFID system includes fingerprint information scanned from the scattering agent that matches the digital fingerprint stored in the RFID system.

8. The method as recited in claim 1, further comprising providing a secure communication channel, including:
combining the digital fingerprint with the information associated with the physical object to form a combined message;
hashing the combined message;
signing the hash of the combined message with a first key to form a signed message; and
storing the combined message and the signed message in a radio frequency identification (RFID) system associated with the scattering agent.

9. The method as recited in claim 8, further comprising:
receiving the combined message and the signed message from the radio frequency identification transponder;
using a second key to verify the signed message against the hash of the combined message;
separating the combined message into the digital fingerprint and the radio frequency identification information;
reading the scattering agent to obtain a test fingerprint;
comparing the digital fingerprint with the test fingerprint; and
determining that an association between the radio frequency identification information and the embedded scattering agent is authentic if the digital fingerprint and the test fingerprint have a degree of similarity that surpasses a threshold.

10. An authentication system, comprising:
a radio frequency certificate of authenticity, including:
a scattering agent consisting of pieces of material for reflecting and refracting radio frequency energy, and
a fixative, for immobilizing the pieces of material into a unique 3-dimensional physical structure, wherein the scattering agent and fixative are attached to a physical object; and
a reader for detecting a unique pattern of reflected and refracted radio frequency energy and for determining a fingerprint associated with the unique pattern.

11. The authentication system as recited in claim 10, wherein exposing the scattering agent to the radio frequency energy causes the unique pattern of reflected and refracted radio frequency energy for determining the fingerprint and wherein the fingerprint authenticates at least one characteristic of the physical object.

12. The authentication system as recited in claim 10, Wherein the scattering agent comprises one of: pieces of one or more metallic conductors, pieces of one or more dielectrics, or a combination of pieces of one or more metallic conductors and pieces of one or more dielectrics.

13. The authentication system as recited in claim 10, further comprising a radio frequency identification system to store and transmit the fingerprint and at least some information associated with the physical object to a radio frequency identification system scanner.

14. The authentication system as recited in claim 13, further comprising:
a hashing module to hash the combined message consisting of the fingerprint and the information about the physical object; and
a signing module to sign the hash of the combined message with a first key to form a signed message;
wherein the combined message and the signed message are concatenated and stored in the radio frequency identification system.

15. The authentication system as recited in claim 14, further comprising a verifier to:
receive the fingerprint from the radio frequency identification system, detect the unique pattern of reflected and refracted radio frequency energy from the scattering agent of the radio frequency certificate of authenticity, determine a test fingerprint based on the detected unique pattern, compare the received fingerprint with the test fingerprint, and authenticate the received fingerprint based on the comparison.

16. The authentication system as recited in claim 14, further comprising a security module to:

use a second key to verify the signed message against the hash of the combined message, separate the combined message into the digital fingerprint and the information associated with the physical object, read the scattering agent to obtain a test fingerprint, compare the digital fingerprint with the test fingerprint, and authenticate the radio frequency certificate or authenticity based on the comparison of the digital fingerprint and the test fingerprint.

17. The authentication system as recited in claim 13, further comprising a privacy manager to decide how much of the information associated with the physical object to send from the radio frequency identification system to the reader.

18. The authentication system as recited in claim 10, wherein the reader further comprises at least one antenna array, wherein the antenna array includes multiple antennae.

19. The authentication system as recited in claim 18, wherein at least one antenna sends radio frequency energy to the scattering agent and receives radio frequency energy from the scattering agent.

20. A system, comprising:

means for reproducibly deriving multiple copies of a fingerprint from radio frequency energy scattered from a physical object, wherein the physical object comprises an embedded scattering agent fixed in a unique 3-dimensional physical arrangement that reflects, refracts, scatters, reradiates, and induces radio frequency energy;

means for associating information about the physical object with a first fingerprint from the physical object;

means for receiving the first fingerprint and the associated information about the physical object; and means for authenticating the information by deriving a second fingerprint from the physical object and comparing the second fingerprint with the received first fingerprint.

* * * * *